Patented June 1, 1937

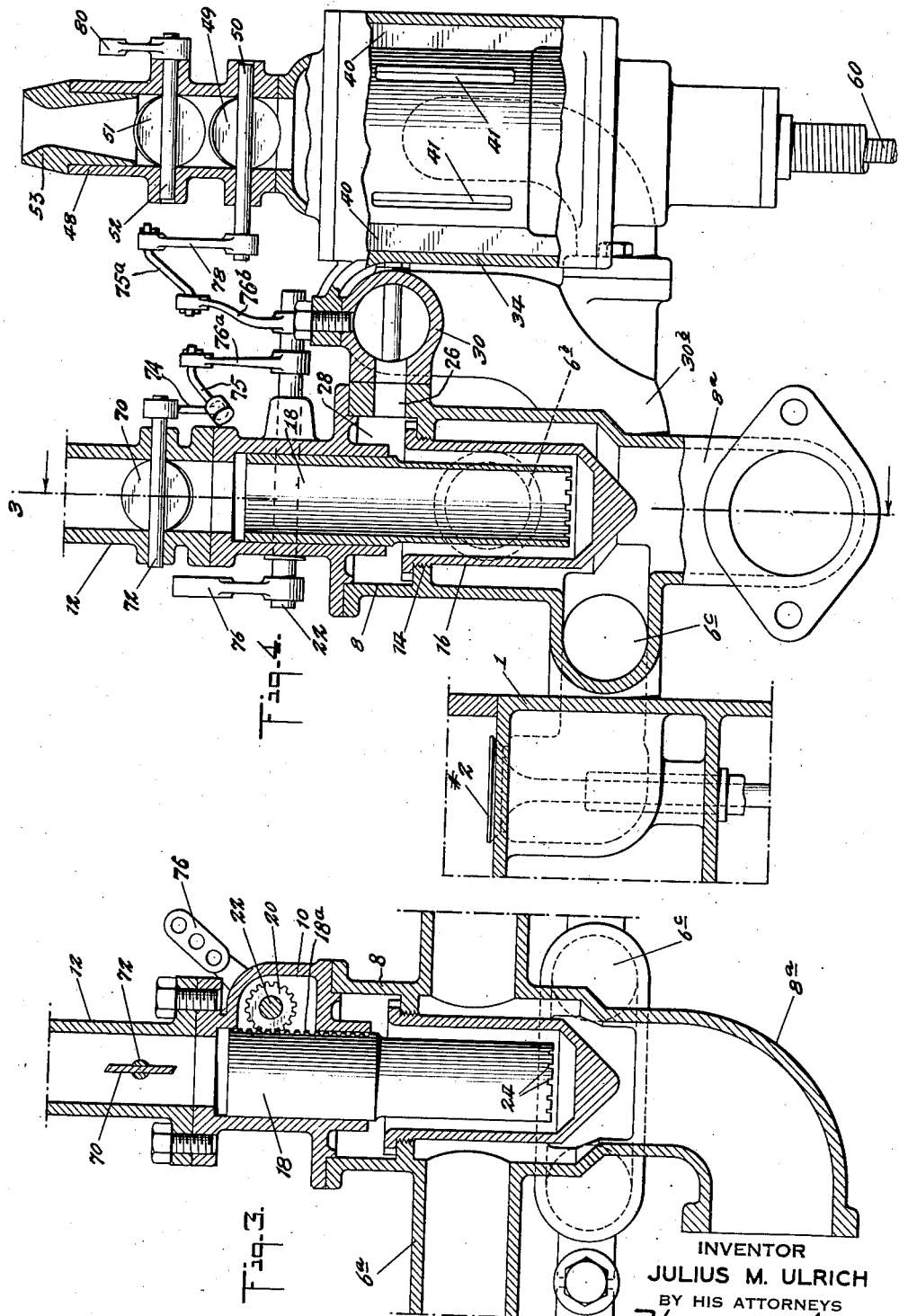

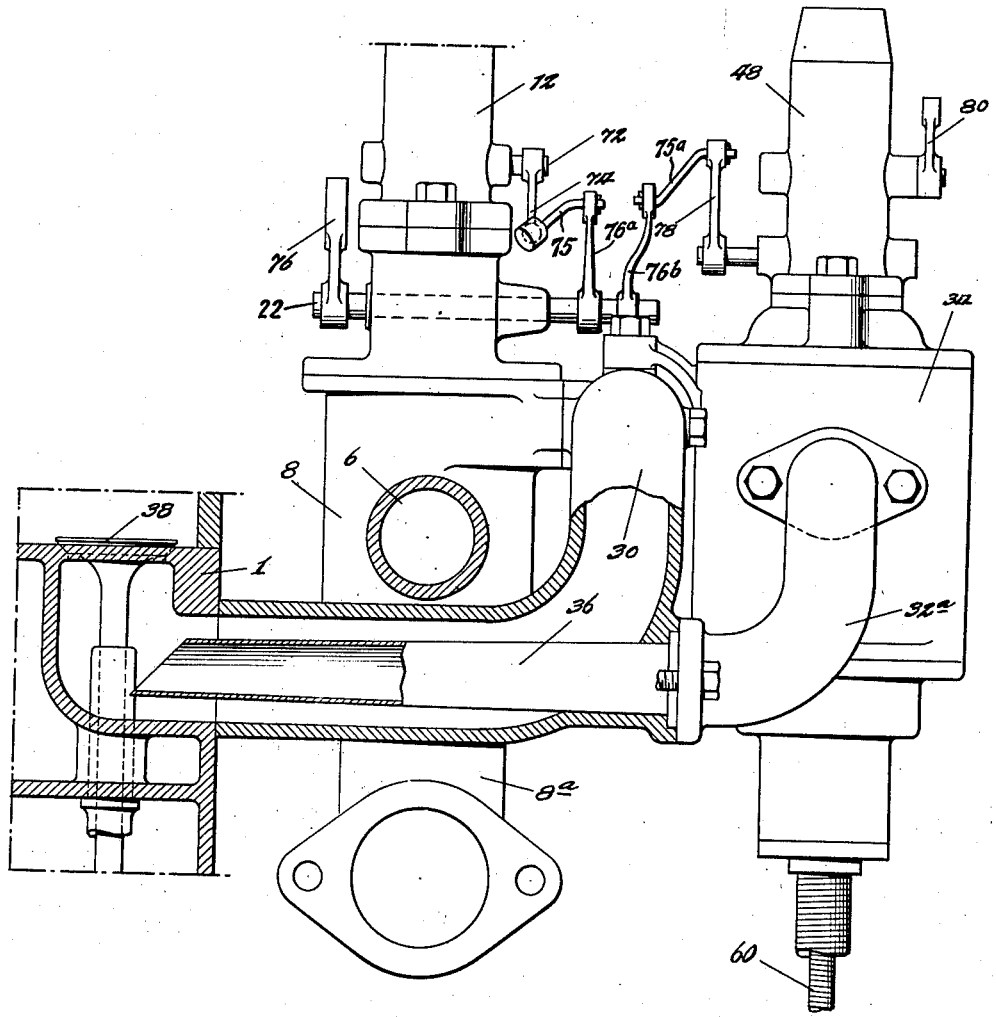

2,082,666

UNITED STATES PATENT OFFICE 2,082,666

INTERNAL COMBUSTION ENGINE

Julius M. Ulrich, Riverside, Conn., assignor, by mesne assignments, to Fuoyl Engine Corporation, Greenwich, Conn., a corporation of Connecticut Application June 22, 1933, Serial No. 677,160

3 Claims. (Cl. 123—122)

This invention relates to internal combustion engines and more particularly to means for supplying fuel to the cylinders of such engines and it is an object of this invention to provide means for supplying fuel of such a nature that fuel oils may be used in place of more volatile fuels, as gasoline, and it is also an object of this invention to provide means for heating the fuel stream so that the fuel used will be supplied to the engine cylinders in a properly gasified condition. It is also an object of this invention to provide means for supplying the air necessary for complete combustion of the fuel in such a way as to permit of a small unit for heating the fuel and without chilling the fuel mixture so as to cause condensation of the vaporized fuel in its passage to the engine cylinder.

In the drawings—

Fig. 3 is a vertical section of the means for heating the fuel supplied, taken as on line 3—3 of Fig. 4;

Fig. 4 is a view partly in section on the line 4—4 of Fig. 1 and partly in elevation, some parts being broken away to show other parts more clearly; and Fig. 5 is a vertical section taken as on line 5—5 of Fig. 1.

Figure 1:
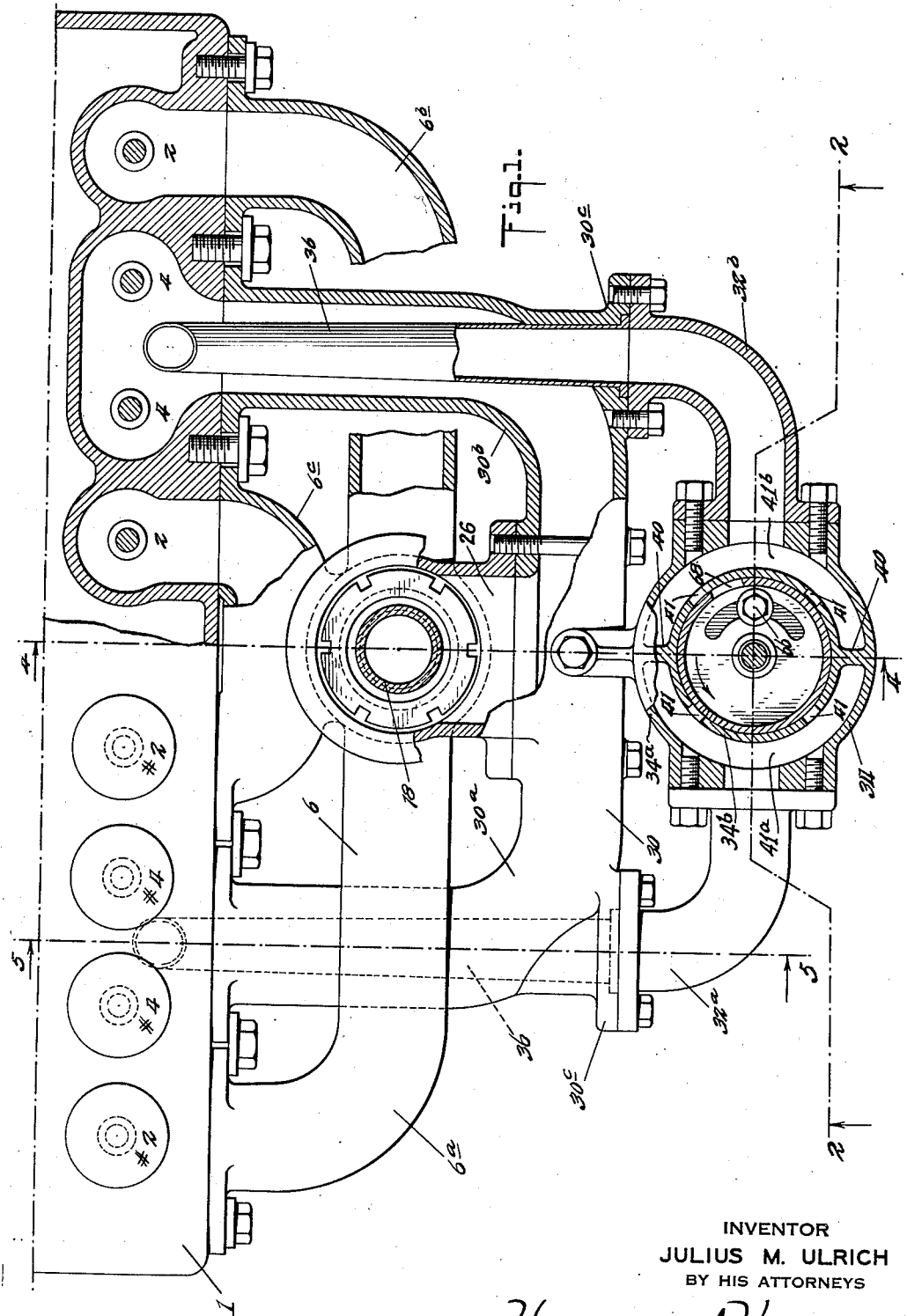
Fig. 1 is a partial top plan view of an internal combustion engine with a fuel feeding means constructed in accordance with this invention applied thereto, parts being broken away to show other parts more clearly.
Figure 2:
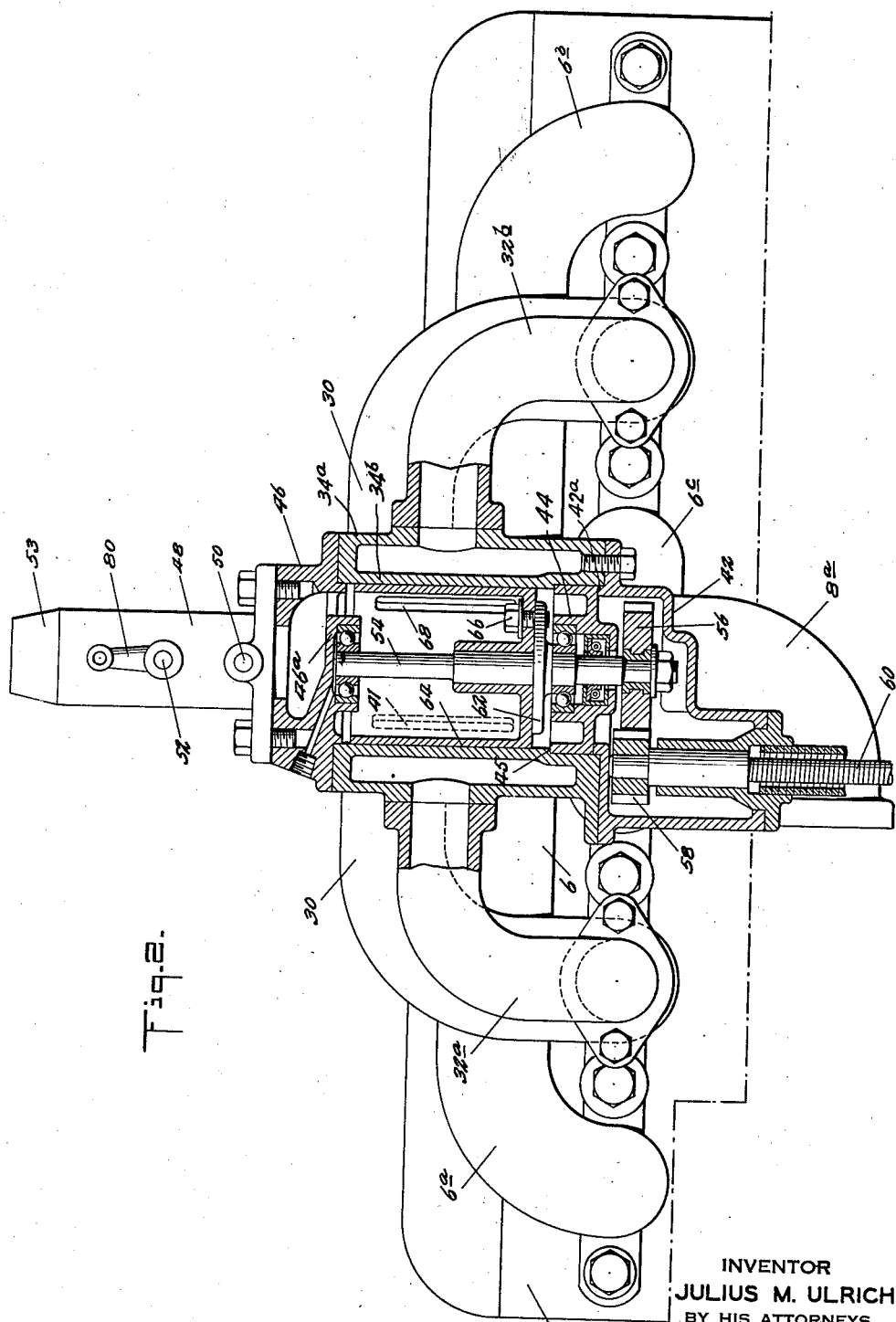
Fig. 2 is a vertical section taken as on line 2—2 of Fig. 1.

In the drawings the invention is shown, for the purposes of illustration, in connection with an internal combustion engine of four cylinders having the usual cylinder block casting 1 in which are the usual exhaust ports 2 and the intake ports 4 to which are connected manifolds. The exhaust manifold 6 comprises the sections 6a and 6b which extend from the end exhaust ports 2 to a central casing 8 where they are united with the exhaust manifold section 6c which connects the center exhaust ports 2 to the casing 8. The casing 8 is substantially cylindrical in form and has extending from its lower end connection 8a leading to the usual discharge pipe and muffler. To its upper end the casing 8 has secured a cap 10 to which is connected the pipe 12 leading from the carbureter, not shown. The casing 8 is provided with an annular shoulder 14 in which is threaded the cup or bowl 16, which cup or bowl extends downwardly from the shoulder 14 into the path of the gases entering the casing 8 from the manifold sections 6a, 6b and 6c, the walls of the bowl 16 being spaced from the casing wall so as to provide an annular passage about the bowl 16 for the passage of the hot exhaust gases. Slidably mounted in the cap 10 is a tube 18 having formed thereon a rack 18a which engages a pinion 20 on a shaft 22 journaled in the walls of the cap 10, the arrangement being such that rotation of the shaft 22 causes the pinion 20 to shift the tube 18 longitudinally in the cap 10 and casing 8, the rack being of sufficient length to permit of the tube 18 being placed in engagement with the bottom of the bowl 16. To prevent sealing of the tube 18 by the bowl 16 the lower portion of the tube 18 is notched or slotted, as at 24, to provide openings through which the gases fed to the tube 18 may pass through to the bowl 16 when the tube 18 engages the bottom of the bowl.

Leading from the casing 18 is a passage 26 which communicates with the chamber 28 above the bowl and connected to the casing 8 so as to form an extension of the passage 26, is an intake manifold 30, having the sections 30a and 30b thereof extending to opposite sides of the casing 8 and connected to the cylinder block 1 of the engine so as to connect the passage 26 with the intake ports 4 in the engine cylinder block 1. Each of the intake manifold sections 30a and 30b has flanges, as at 30c, about openings formed in the manifold sections and secured to the flanges 30c are the sections 32a and 32b of an air supply manifold which lead from the air distributor valve casing 34 to the intake manifold. At each of the flanges 30c the tubes 36 are mounted in the openings in the intake manifolds and are held in position by the sections 32a and 32b of the air supply manifold, the tubes 36 forming continuations of the air supply manifold sections 32a and 32b through the intake manifold sections 30a and 30b to the intake ports 4, the ends of the tubes 36 terminating within the ports 4 of the cylinder block 1 adjacent the intake valves 38. The air distributor valve casing 34 is formed with spaced cylindrical walls 34a, 34b joined by ribs 40 forming chambers 41a and 41b at opposite sides of the valve casing which communicate with the sections 32a and 32b respectively of the air supply manifold. Each portion of the inner wall 34b between the ribs 40 is provided with spaced ports 41. The bottom of the casing 34 is closed by an irregular head or cap 42 provided with an upwardly extending flange 42a which engages a bearing seat or retainer 44, and holds the same in engagement with a shoulder 45 on the inner wall 34$^b$. To the upper end of the casing 34 is secured a cap 46 having a portion 46$^a$ which serves as a bearing retainer and connected to the outer end of the cap 46 is an intake pipe 48 in which is mounted a throttle valve 49 on a shaft 50 journalled in the walls of the pipe 48 and a choke valve 51 mounted on a shaft 52 also journalled in the walls of the pipe 48. Outwardly of the choke valve 51 is a venturi 53 which is proportioned to the intake of the carbureter connected to the pipe 12.

Mounted in the bearings carried by the retainers 44 and 46$^a$ is a shaft 54 having its lower end extending beyond the lower bearings and provided with a gear 56 fixed thereon. Meshing with the gear 56 is a pinion 58 driven by a flexible shafting 60 or other suitable means driven from the crank shaft of the engine, the pinion 58 and gear 56 being proportioned to operate the shaft 54 at the desired speed relatively to the speed of the engine crank shaft. Secured on the shaft 54 is a collar or shoulder 62 upon which is seated a tubular valve 64 which fits the opening formed by the wall 34$^b$ and which is closed at its lower end where it engages with the collar 62 except for the sleeved opening which receives the shaft 54 and the curved slot 65 through which passes the set screw 66 which secures the valve 64 to the collar 62 and permits of adjusting the valve 64 with respect to the intake valves of the engine. The upper end of the valve 64 is open and in direct communication through the cap 46 with the intake pipe 48. The cylindrical wall of the valve 64 is provided with a longitudinally extending port 68 which, during the rotation of the valve 64, establishes communication between the pipe 48 and the air supply manifold sections 32$^a$ and 32$^b$ through the ports 41 of the inner wall 34$^b$ of the valve casing 34. The arrangement shown establishes communication with the air supply manifold sections so that air is supplied to the engine cylinders for an initial portion of the suction stroke of each piston and while the arrangement of the ports in the valve and valve casing may differ for engines of different numbers of cylinders or of different firing orders it is to be understood that in each case air is supplied through the air distributor valve to each cylinder during the suction stroke thereof.

In the pipe 12 is a throttle valve 70 mounted on a shaft 72 journalled in the walls of the pipe 12. To the outer end of the shaft 72 is secured a crank 74 which is connected by a suitable link 75 with the crank 76$^a$ on the shaft 22 and a crank 76$^b$ on the shaft 22 is connected by link 75$^a$ with the crank 78 on the shaft 50 so that operation of the crank 76 causes the tube 18 in the casing 8, the throttle valve in the pipe 12 and the throttle valve 49 in the pipe 48 to be operated simultaneously and proportionately, the links and cranks being arranged to provide the valves and tube with the desired relative movement. The choke valve 51 may be operated automatically by a thermostatic control or the crank 80 on the shaft 52 may be connected for manual operation.

In the operation of this device a fuel mixture is supplied through pipe 12, past the throttle valve 70 and through the tube 18 to the bowl 16, thence through chamber 28, the passage 26 and the intake manifold sections 30$^a$ and 30$^b$ to the intake ports 4 and past intake valves 38 to the engine cylinders. The exhaust gases from the cylinders pass from the exhaust ports 2 through the sections 6$^a$, 6$^b$ and 6$^c$ of the exhaust manifold to the casing 8 where they heat the walls of the bowl 16 in their passage through the casing 8 to the exhaust pipe 8$^a$.

In starting, the bowl 16 may be heated in any suitable manner, as by using a readily volatile fuel, such as gasoline, to start with. After the bowl 16 is heated a fuel, such as fuel oil, is supplied to the engine through the heating unit as above described. With the engine in operation the flexible shafting 60 drives the shaft 54 of the distributor valve 64, rotating the valve and connecting the port 68 of the valve with the ports 41 in the inner wall 34$^b$ of the casing 34, establishing communication from the air intake pipe 48 past the throttle valve 50 through valve 64 and the casing 34 to the air supply manifold sections 32$^a$ and 32$^b$ whence the air passes through the pipes 36 in the manifold sections 30$^a$ and 30$^b$ to the intake ports 4 where the air mixes with the fuel supplied through the intake manifold 30. The arrangement of the ports 68 and 41 may be such as to give any desired proportion of air to the fuel supplied through the carbureter in the usual way but, as shown, the ports provide for admission of air during the initial portion of the intake stroke of each cylinder, cutting off the supply at from 90 to 100 degrees of angular movement of the crank shaft in each suction stroke after which fuel alone is supplied to the intake ports through the valve casing 8. The port 68 of the valve 64 is arranged to establish connection with the ports 41 in the casing wall 34$^b$ so that air is supplied to the manifold sections 32$^a$ and 32$^b$ in time with the suction strokes of the cylinders connected to the manifold sections. Using the separate air distributor valve gives a control which permits of supplying excess air for a predetermined portion of the intake stroke and providing a leaner mixture during the earlier portion of the stroke, after which only the fuel mixture supplied through the carbureter in the usual way is fed to the cylinders. The adjustment of the carbureter supplying the fuel to the pipe 12 may be such as to provide a slightly richer mixture than normal in engines of this type. Supplying the air through a separate air distributing valve reduces the volume of gas and air which passes through the tube 18 and causes a higher temperature to be maintained in the heating element than is possible where all the air supplied to engine cylinders contacts with the heating element. The operation of the tube 18 with the throttle causes the tube 18 to approach the bottom of the bowl 16 as the throttle valve is closed so that as the quantity of fuel supplied through the tube 18 lessens it is kept in contact with the bottom and sides of the bowl 16 and secures the full benefit of the heat of the exhaust gases at this time.

In the idling position of the throttle valve the tube 18 is arranged to be in contact with the bottom of the bowl 16 causing the fuel supplied at this time to pass through the slots or notches 24 in the wall of the tube 18 so that the gases are supplied in small streams which may be readily heated and full advantage taken of the heat supplied to the bowl.

Supplying the air necessary for combustion through the pipes 36 directly to the intake ports reduces the cooling of the gases in the intake manifold 30 in their passage to the intake ports, thus preventing condensation in the intake manifold where the less volatile grades of fuel are used while at the same time the gases are cooled at the engine cylinder so that a proper charge is at all times taken by the cylinders upon the suction stroke of the pistons.

Supplying an excess of air during the initial movement of the piston causes the portion of the charge first admitted to the engine cylinders to be much leaner than the final portion of the charge giving a stratification of the charge in the engine cylinder which slows the combustion of the charge and permits of the use of higher compression ratios while maintaining substantially complete combustion.

Extending the tube 18 into the bowl 16 in the manner described creates the maximum turbulence in the bowl at all throttle openings. This causes better mixing of the fuel and at the same time prevents the formation of carbon deposits in the bowl 16. The turbulence in the bowl 16 is further increased by the variation in the rate of flow of the fuel through the bowl 16 caused by the admission of air to the cylinders through the valve 64.

I claim—

1. In an internal combustion engine, a fuel supply means, means for controlling the fuel supply and means for heating the fuel supply comprising a heated tubular member closed at one end and a second tubular member telescoping in said heated member, said second tubular member being notched for discharging all fuel supplied when engaged with the closed end of said heated tubular member.

2. In an internal combustion engine, a fuel supply means and means for heating the fuel supplied comprising a cylindrical casing, a tubular member closed at one end forming a chamber with a portion of said casing, said casing having an outlet for said chamber, a second tubular member connected to said fuel supply means and extending into said chamber to direct all fuel to the closed end of said first tubular member, means to reciprocate said second tubular member in said chamber to engage the closed end of said first tubular member, said second tubular member being notched to permit passage of fuel when in engagement with the closed end of said first tubular member and means to apply heat to the walls of said first tubular member.

3. In an internal combustion engine, a fuel supply means, a cylindrical casing closed at one end thereof, means for heating walls of said casing, a tubular member connected to said fuel supply and extending into said casing to discharge all fuel adjacent the closed end of said casing said tubular member being notched at the discharge end thereof and spaced from the cylindrical wall of said casing to form a fuel passage between said member and casing and means to reciprocate said tubular member to engage the closed end of said casing.

JULIUS M. ULRICH.